UNITED STATES PATENT OFFICE.

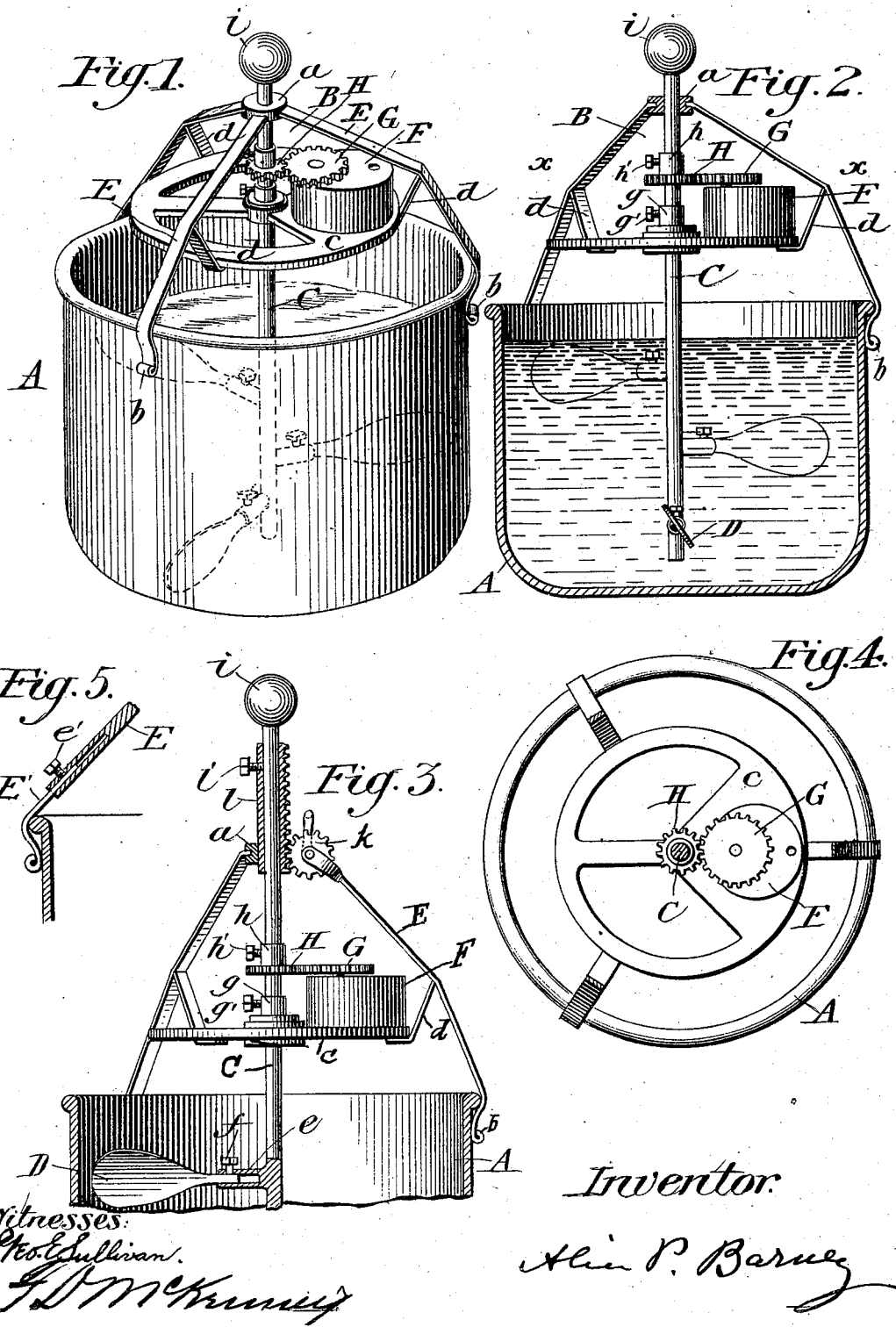

ALICE P. BARNEY, OF WASHINGTON, DISTRICT OF COLUMBIA.

FLUID-AGITATOR.

SPECIFICATION forming part of Letters Patent No. 723,977, dated March 31, 1903.

Application filed July 3, 1902. Serial No. 114,249. (No model.)

*To all whom it may concern:*

Be it known that I, ALICE P. BARNEY, a citizen of the United States, residing at Washington, in the District of Columbia, have invented certain new and useful Improvements in Fluid-Agitators, of which the following is a specification.

My invention relates to devices for automatically agitating fluids, and particularly to that class of fluids which are usually cooked or treated in domestic boilers or cooking-receptacles.

It is the object of my invention to provide an improved device by which a slow agitation or stirring of liquids, such as soups, while the same are in the process of being cooked in the pots, boilers, or other vessels especially adapted for that purpose may be secured in a highly convenient and effective manner.

My device is so constructed that the stirring-shaft thereof may be raised and lowered to accommodate the depth of the fluid, as also vessels of varying depths, the same being effected in a simple yet most advantageous manner.

The device, furthermore, is so constructed that in the cooking process the heat rising from the fluid will not have placed in its pathway any sudden obstacle by reason of which the heat will be deflected back into the receptacle; but by my invention an open framework is presented and so constructed and arranged that the rising heat can easily and uninterruptedly wend its way upward into the open air.

My device is also readily attachable and detachable to and from the top of any receptacle and may be left in operation as long as desired and then very quickly and easily removed.

It consists of a support which is adapted to be clamped onto the periphery of a receptacle and has a shaft to which are attached propeller-blades at the lower end thereof in such a manner that the blades are immersed in the fluid. The shaft is revolved by a train of gears operated from a simple clockwork mechanism, all of which are attached to the support or frame of the device.

In order that the device may be operated in any size of vessel, the frame of the support may have extensible arms thereon which are adapted to fasten the support to the periphery. The stirring-blades of the device may be adjusted laterally on the shaft to accommodate vessels of varying diameter.

Further details of my invention will be explained in the following description, taken in connection with the accompanying drawings, in all of which like reference characters refer to corresponding parts.

In the drawings, Figure 1 is a perspective view of my device attached to the ordinary kettle. Fig. 2 is a longitudinal section of the kettle having the device attached and shown partly in section. Fig. 3 is a fragmentary longitudinal section of the kettle and a modification of the device, showing a particular vertical adjustment of the shaft. Fig. 4 is a plan section taken on the line $x\,x$, Fig. 2. Fig. 5 is a fragmentary longitudinal section of one of the clamping-arms, showing the same extensible.

Referring to Figs. 1 to 5, inclusive, A represents the kettle or boiler, and B the agitator or stirrer, which is made up of the three spring-arms E, which are brought at their upper ends to a common center at the collar $a$. These arms spread outwardly and downwardly and terminate in knuckles $b$, which are adapted to press against the side of the kettle when the arms are sprung over the beaded edge thereof. Inside of the arms E is suspended the plate $c$, which is fastened to the arms E by the downwardly-projecting arms $d$. The plate $c$ is circular, but of a less diameter than the periphery of the kettle, and is located considerably above the top thereof, so as to leave the top of the receptacle open to the atmosphere, and in order not to present a large surface over the top of the heated fluid the plate $c$ has an opening therein, or, in other words, has a skeleton frame. The center of this plate is perforated, as is also the collar $a$, to furnish bearings for the shaft C. The lower portion of the shaft C contains a plurality of sockets extending laterally therefrom in different directions, so as to permit the lateral adjustments of the blades D. These blades are fastened in position in the socket by set-screws $f$. The bearing-collar $g$ is adjustably fastened to the shaft C by the set-screw $g'$. This bearing-collar rests upon the plate $c$ and supports the shaft C in its bearing. The clockwork F rests upon the plate c and operates the gear-wheel G, which is in mesh with the pinion H, fastened to the bottom of the collar h on the shaft C. The upper end of the shaft C terminates in the ball i, and by loosening the set-screws h' and g' the shaft may be raised and lowered through the bearings in the collar a and plate c to any desired position in order to properly locate the blades D within the fluid. In Fig. 3 this vertical adjustment is facilitated by the pinion k and rack l. This rack is fastened to the shafts C by the set-screw l' and is held in the frame by the collar a and the pinion k. Thus by loosening the set-screws h' and g' the rack may be readily raised and lowered by the pinion k, thus permitting a most delicate adjustment of the shaft C, if desired. The arms E may have a socket in their ends to permit the adjustment of the extension E'. This extension may be slid longitudinally in the socket and fastened in any desired position by the set-screw e' to obtain any desired length for the arms in order to attach the support to any-size vessel. By this construction it may be readily seen that the spring-motor F when started will revolve the blades D within the fluid of the receptacle through the medium of the pinions g h and shaft C.

It is not necessary in the construction of the device to have any of the adjustments described, for the same may be made to fit one size of vessel, if desired. Neither is it necessary to utilize any particular style of motor, for in some cases it may be desirable to use other styles than those illustrated—as, for instance, an electric motor. The motor may be adjusted to run at any desired speed.

Although I have used various terms throughout this specification—such as "kettle," "vessel," "clockwork," "clamps," &c.—yet I do not wish to be limited by the use of any such terms and reserve the right to use any of the well-known equivalents thereof. Neither do I wish to be limited to any particular material in the construction of my device and may use a non-conducting material, such as wood, wherever I find it expedient.

I am aware that in the art prior to the present invention there existed devices for agitating fluids automatically as well as by hand; but such is not, broadly, my invention, which resides in the novel construction and arrangement of parts producing the improved results set forth, and particularly pointed out in the appended claim.

What I claim, and desire to secure by Letters Patent of the United States, is—

In a device for agitating fluids, the combination with the open-work supporting-frame comprising a plurality of spring clamping members E, provided with knuckles b, and the open-work frame-plate c suspended from said spring clamping members at points intermediate the extremities of the latter so that when the device is attached to a fluid-containing receptacle said frame-plate will be located at a distance above the mouth of such receptacle, of the shaft C journaled in the supporting-frame and adapted to project into a fluid-containing receptacle when the device is in position, means on the lower end of the shaft for agitating fluids, and means located upon the frame-plate c for communicating motion to the shaft C, substantially as shown and described.

In testimony whereof I have signed my name to this specification in the presence of two subscribing witnesses.

ALICE P. BARNEY.

Witnesses:
FREDERIC D. MCKENNEY,
GEORGE E. SULLIVAN.